US012410044B2

(12) United States Patent
Iotti (10) Patent No.: US 12,410,044 B2
(45) Date of Patent: Sep. 9, 2025

(54) TELEHANDLER WITH CONVERTIBLE PROPULSION

(71) Applicant: MANITOU ITALIA S.R.L., Castelfranco Emilia (IT)

(72) Inventor: Marco Iotti, Reggio Emilia (IT)

(73) Assignee: MANITOU ITALIA S.R.L., Castelfranco Emilia (IT)

( * ) Notice: Subject to any disclaimer, the term of this patent is extended or adjusted under 35 U.S.C. 154(b) by 406 days.

(21) Appl. No.: 17/868,842

(22) Filed: Jul. 20, 2022

(65) Prior Publication Data
US 2023/0026643 A1 Jan. 26, 2023

(30) Foreign Application Priority Data

Jul. 21, 2021 (IT) .......................... 102021000019406

(51) Int. Cl.
*B66F 9/075* (2006.01)
*B60L 50/10* (2019.01)
(Continued)

(52) U.S. Cl.
CPC ............ *B66F 9/0655* (2013.01); *B60L 50/10* (2019.02); *B60L 53/54* (2019.02);
(Continued)

(58) Field of Classification Search
CPC .......... B60L 50/10; B60L 53/54; B60L 53/80; B60L 53/62; B60L 53/61; B60L 2200/42; B60W 2300/12
See application file for complete search history.

(56) References Cited

U.S. PATENT DOCUMENTS 5,251,721 A * 10/1993 Ortenheim ............... B60K 5/10
180/65.25
5,419,131 A * 5/1995 Doppstadt ............... F02B 63/00
60/458
(Continued)

FOREIGN PATENT DOCUMENTS

DE 4140508 A1 6/1993
DE 4427322 A1 2/1996
(Continued)

OTHER PUBLICATIONS

Office Action issued in corresponding Canadian Patent Application No. 3,167,510; Dated: Sep. 16, 2024.

*Primary Examiner* — Steve Clemmons
(74) *Attorney, Agent, or Firm* — Chrisman Gallo Tochtrop LLC (57) ABSTRACT

Described is a telehandler (1) equipped with at an electric propulsion motor and with several containment compartments (100) for housing means (200, 300) for powering the motor. A compartment (100) is provided with an access opening to allow a user to insert or extract a source of electricity (200, 300) included in the power supply means. A plurality of electric batteries (200) is made available, each designed to be inserted in one of the compartments (100). An electricity generator apparatus (300) is provided for insertion in one of the compartments (100). The telehandler (1) is equipped with the following alternative power supply configurations: a fully electrical configuration wherein the power supply means comprise only one or more electric batteries (200); and a hybrid configuration wherein the power supply means include the electricity generator apparatus (300).

17 Claims, 8 Drawing Sheets

(51) Int. Cl.
   *B60L 53/54* (2019.01)
   *B66F 9/065* (2006.01)
   *B66F 9/24* (2006.01)

(52) U.S. Cl.
   CPC ...... *B66F 9/07531* (2013.01); *B66F 9/07572* (2013.01); *B66F 9/24* (2013.01); *B60L 2200/42* (2013.01)

(56) References Cited

U.S. PATENT DOCUMENTS

| | | | |
|---|---|---|---|
| 5,861,569 A | 1/1999 | Abels | |
| 6,012,544 A * | 1/2000 | Backer | B66F 11/044 182/2.1 |
| 8,459,390 B2 * | 6/2013 | Brings | B60L 50/16 180/68.5 |
| 9,889,742 B2 * | 2/2018 | Chen | B60L 1/003 |
| 11,148,550 B2 * | 10/2021 | Rocholl | B65F 3/00 |
| 11,584,626 B2 * | 2/2023 | Iotti | B66F 9/07572 |
| 2008/0006459 A1 * | 1/2008 | Niebuhr | B66F 9/0754 180/68.5 |
| 2011/0068309 A1 * | 3/2011 | Haslberger | B60L 50/66 254/2 R |
| 2011/0100735 A1 * | 5/2011 | Flett | B60L 50/13 180/65.285 |
| 2011/0226539 A1 * | 9/2011 | Huss | B60L 53/80 180/65.21 |
| 2017/0001846 A1 | 1/2017 | Paavolainen | |
| 2019/0389705 A1 * | 12/2019 | Radtke | B66F 9/22 |
| 2020/0031643 A1 * | 1/2020 | Iotti | B60L 50/15 |
| 2021/0031611 A1 | 2/2021 | Yakes et al. | |
| 2022/0098017 A1 * | 3/2022 | Di Florio | B60L 50/15 |
| 2023/0365023 A1 * | 11/2023 | Li | B60L 50/61 |
| 2024/0212402 A1 * | 6/2024 | Iotti | B60L 53/80 |

FOREIGN PATENT DOCUMENTS

| | | | | |
|---|---|---|---|---|
| DE | 102011115570 A1 * | 4/2013 | | B60K 1/04 |
| EP | 1329351 A1 * | 7/2003 | | B60K 6/40 |
| EP | 1481838 A2 * | 12/2004 | | B60L 11/126 |
| EP | 3112312 A1 | 1/2017 | | |
| GB | 2443272 A * | 4/2008 | | B60K 1/04 |
| RU | 2570242 C2 | 12/2015 | | |
| WO | 2011/035056 A2 | 3/2011 | | |

* cited by examiner

TELEHANDLER WITH CONVERTIBLE PROPULSION

This invention relates to a telehandler with convertible propulsion.

In detail, the invention relates to a telehandler with a propulsion that can be switched from electric to hybrid and vice versa by the user.

There are prior art electric telehandlers, equipped with an electric motor, powered by one or more batteries, in place of the traditional internal combustion engine, which have the advantage of not diffusing exhaust gas in the environments in which they work.

The environmental regulations of many countries require that electric telehandlers be used instead of those with a fossil fuel power supply if works are to be performed in closed environments, such as industrial sheds, or in zones of residential centres where restrictions apply to the traffic and to the type of vehicles allowed to circulate, such as town centres.

However, the use of the prior art electric telehandlers has several limitations briefly illustrated below.

Firstly, it may be the case that the use of the telehandler is requested in more than one work site or that, at the end of the planned operations, the vehicle must be returned to the yard; in these circumstances, the residual autonomy of the batteries may not be sufficient to move the telehandler to the destination, which requires inconvenient and time-consuming procedures for recharging the batteries.

Further, for some user companies, the fact of having to provide an electric telehandler to be able to operate in those sites for which the law specifies the above-mentioned limitations constitutes an additional cost, the amortisation times of which can be very uncertain, since they depend on the frequency of the orders for which it is necessary to use an electric telehandler.

Moreover, it may sometimes occur that the energy supplied by a battery, even completely charged, may not be sufficient to complete the programmed work and, on the other hand, it may be complicated to find a recharging source to which to connect the battery; consider, for example, the case in which the machine is operating in a historical town centre.

In addition, even if a gen-set (engine generator set) were available, in the case, for example, in which the telehandler is operating inside a shed, the interruption of the operating activities due to the need to recharge the battery significantly affects the time for completion of the programmed activities.

The technical purpose which forms the basis of the invention is to provide a telehandler with switchable power supply which overcomes the limitations of the prior art.

The technical purpose specified is achieved by the telehandler made according to the appended claims.

Further features and advantages of the present invention are more apparent in the non-limiting description of a preferred embodiment of the proposed telehandler, as illustrated in the accompanying drawings, in which.

Figure 1:
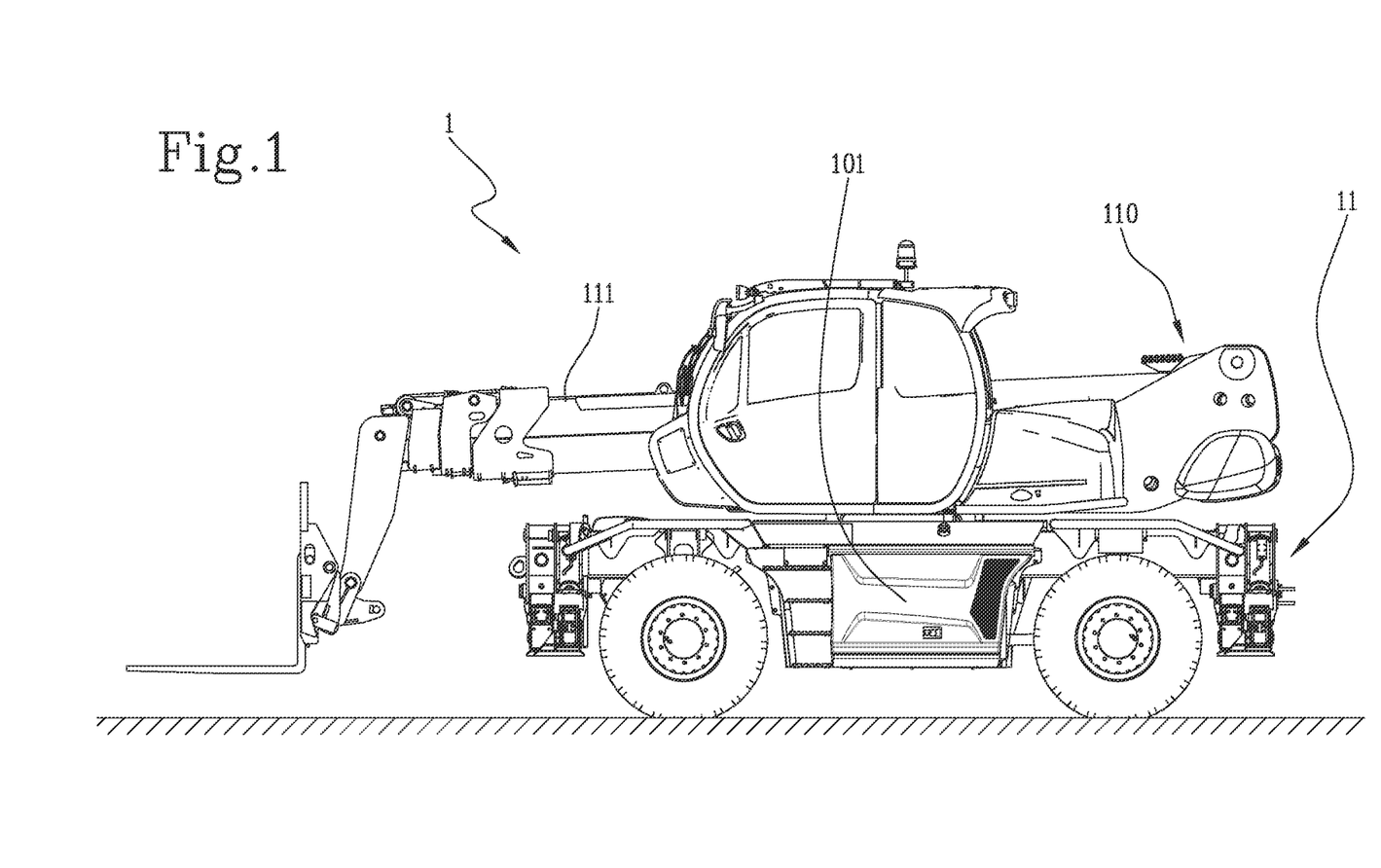
FIG. 1 is a schematic side view of a telehandler according to the invention.
Figure 2:
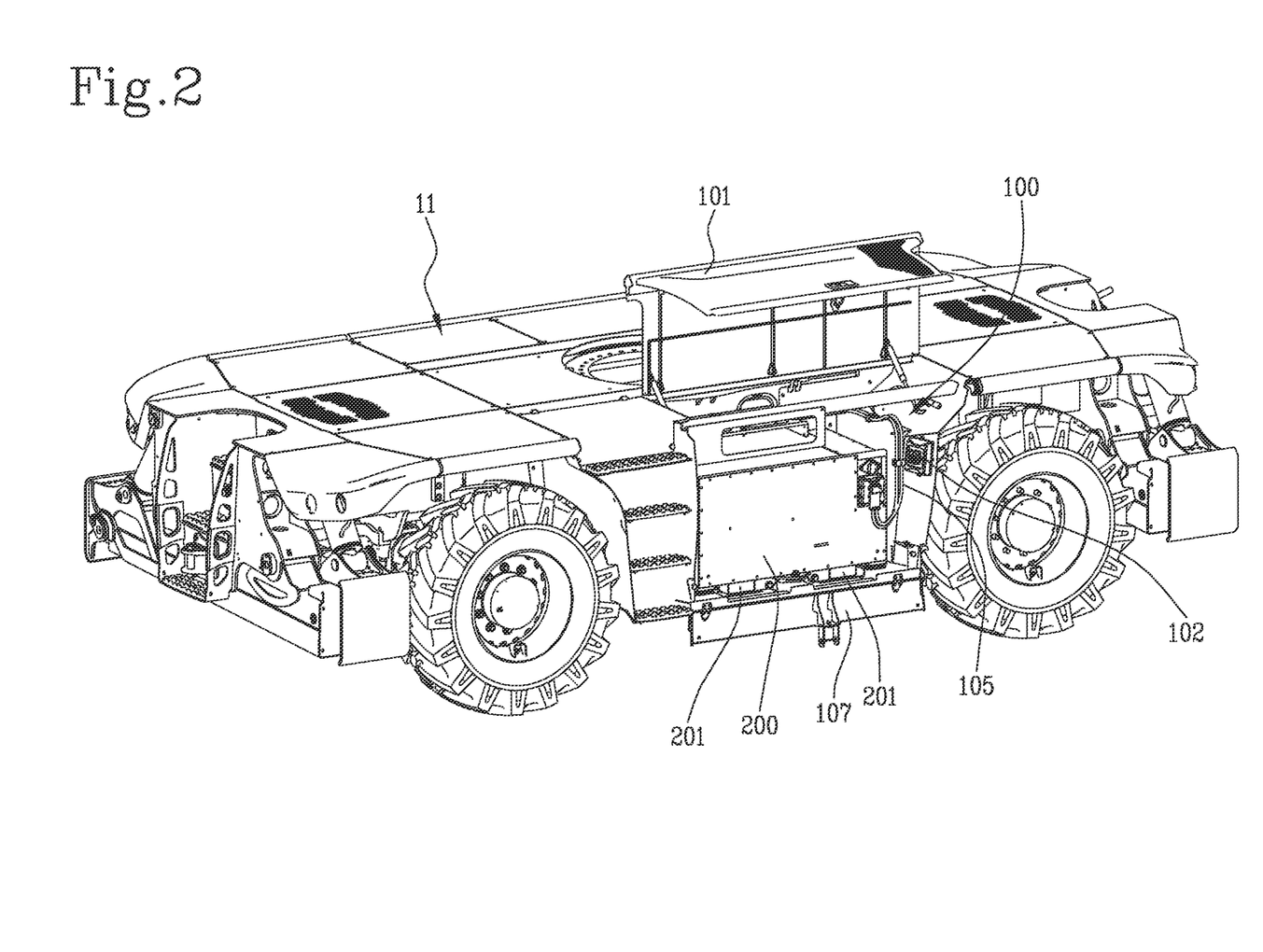
FIGS. 2-6 are axonometric views of the telehandler of FIG. 1, shown without a turret for reasons of legibility of the drawings, shown in various operating configurations and in the relative transition steps.
Figure 3:
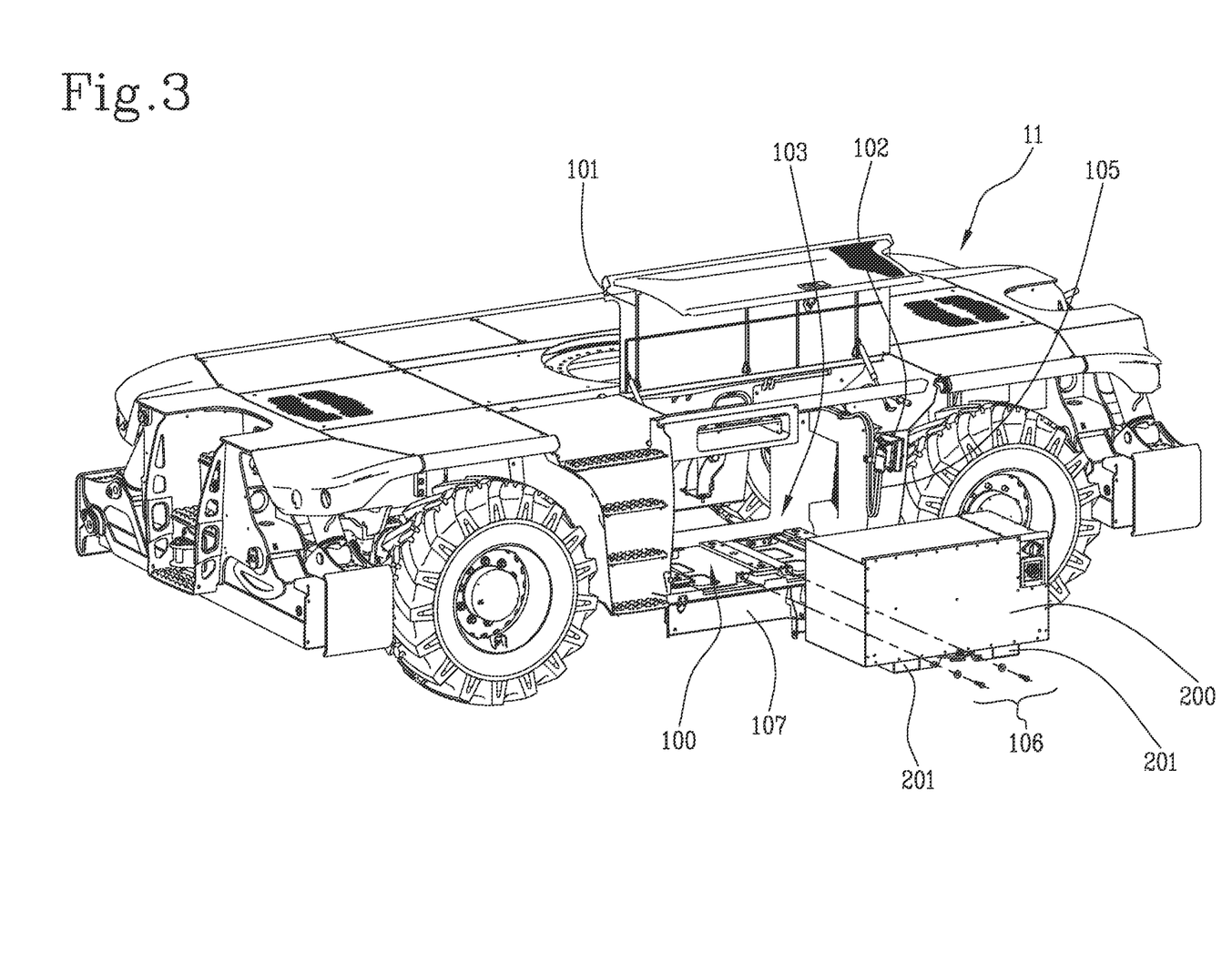
Figure 4:
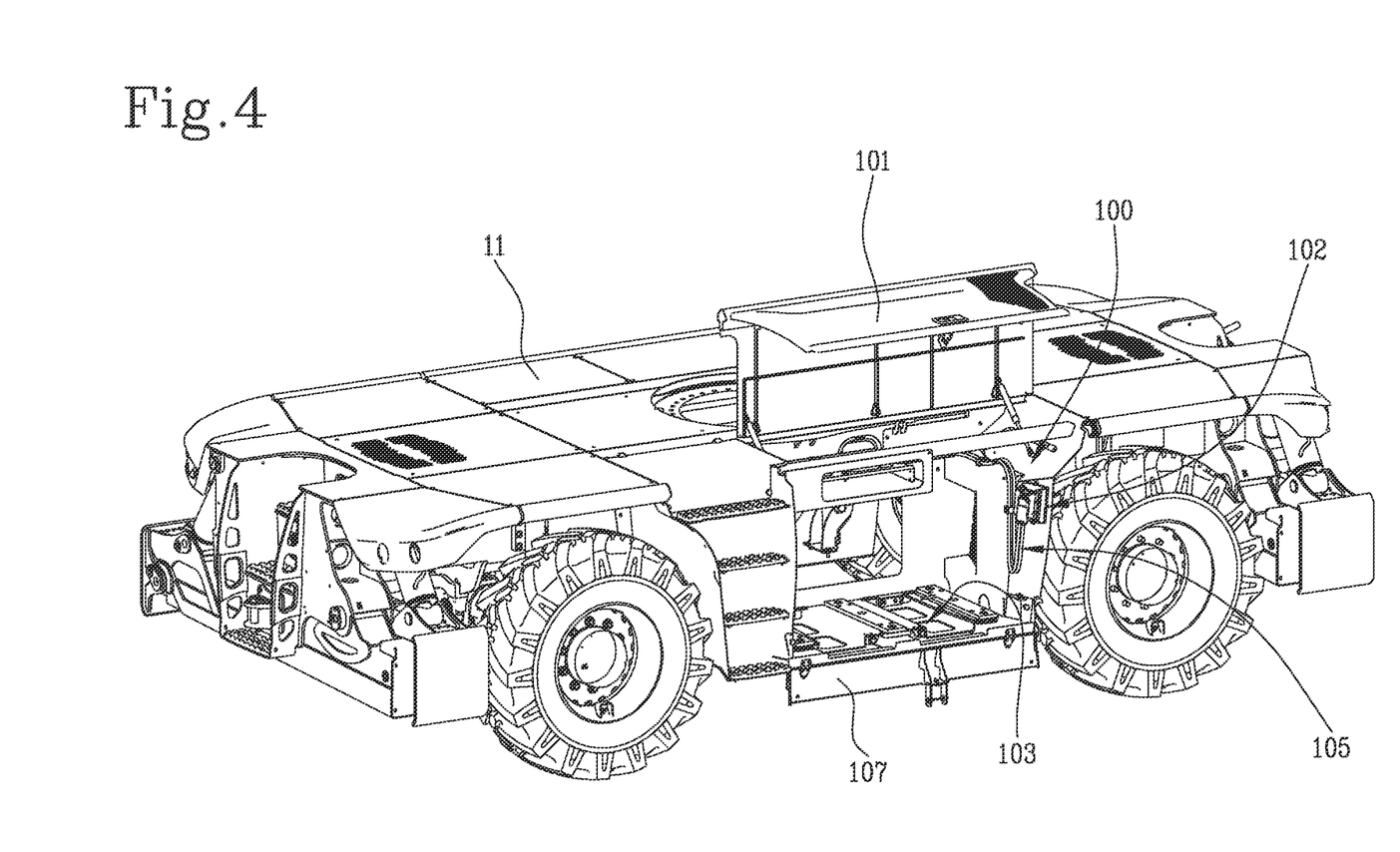
Figure 5:
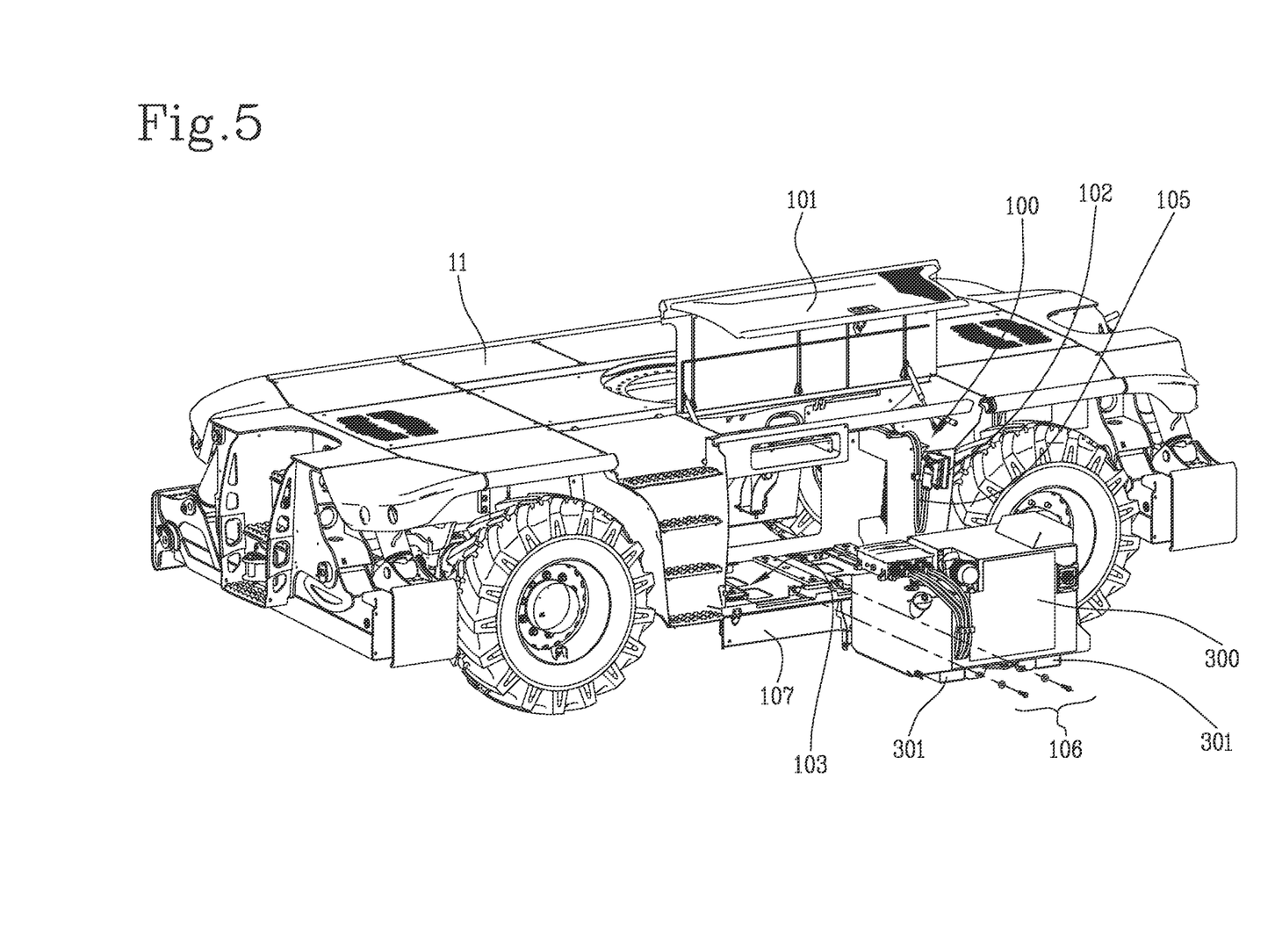
Figure 6:
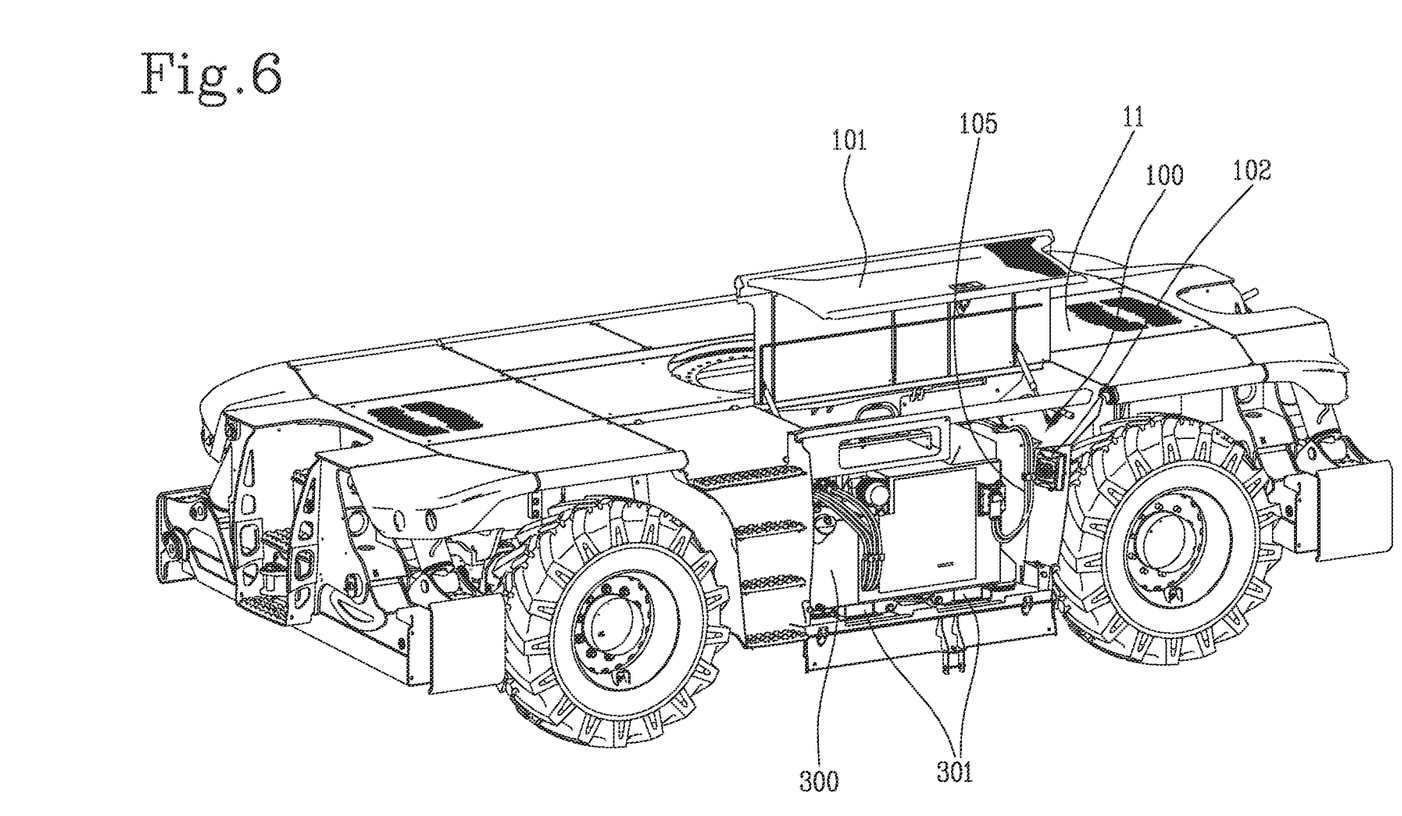

With reference to the first drawing, the numeral 1 denotes in its entirety an electrically powered telehandler according to the invention.

The telehandler 1 proposed is equipped with a frame 11, or "carriage", movable on wheels and may be either fixed or rotary, that is to say, it can mount the cab and the operating arm directly on the carriage 11 or, as in the case illustrated, may be equipped with a platform, or "turret" 110, mounted rotatably on the carriage 11, which supports the cab and operating arm.

The telehandler 1 according to the invention may comprise at least one electric drive motor positioned at one of the axles and an electric motor for driving the hydraulic pump which powers, using a distributor, the movement cylinders of the arm 111 and, if necessary, the motor-driven rack of the tower 110.

The telehandler 1 is advantageously equipped with a plurality of containment compartments 100 for housing the means 200, 300 which power at least the propulsion motor. The power supply means comprise the energy sources 200, 300 which, considered as a whole, electrically power at least the propulsion motor and the pump motor.

Preferably, the carriage 11 of the telehandler can define two lateral compartments 100, made in its opposite lateral portions, right and left, accessible on opposite sides, each of which is designed to house the above-mentioned power supply means 200, 300.

At least one of the compartments 100 (and preferably all) is provided with an access opening to allow a user to insert or extract, and in particular replace, the power supply means 200, 300.

In detail, the access opening of the compartment 100 may be positioned on a relative side of the carriage 11, facing outwards, thereby allowing an insertion and an extraction of the power supply means 200, 300 along a horizontal direction (see FIGS. 2-6).

The opening is equipped with a door 101, or "hood", to allow access to the compartment 100 from the outside; the door 101 may be of the tilting type and equipped with a lock.

The invention also comprises two types of electricity supply sources: electric batteries 200 and electricity generator apparatuses 300.

In detail, the invention uses a plurality of electric batteries 200, each designed to be inserted in one of the compartments 100 and at least one electricity generator apparatus 300 designed to be inserted in one of the compartments 100.

The electricity generator apparatus 300 may be designed for producing electricity by consuming fossil fuel, for example it may be a so-called "diesel-electric generator" or it may be a fuel cell or other apparatus which, starting from some form of fuel, produces electricity.

According to an important aspect of the invention, the telehandler 1 is provided with two alternative power supply configurations, which can be switched by the action of a user:

a fully electrical configuration wherein the power supply means include only one or more electric batteries 200; and a hybrid configuration wherein the above-mentioned power supply means include the electricity generator apparatus 300.

As will become clearer in the description which follows, in the fully electrical configuration, the power supply means which are on board the telehandler 1 include batteries 200 but not electricity generator apparatuses 300, whilst in the hybrid configuration they include at least one electricity generator apparatus 300.

Preferably, in the hybrid configuration, the power supply means include an electric battery 200 which supplies the propulsion motor and the motor which drives the pump and an electricity generator apparatus 300 set up for charging the battery 200. For this reason, in order to switch from the hybrid configuration to the fully electrical configuration it may also be sufficient to remove from the telehandler 1 the electricity generator apparatus 300 and to switch from the fully electrical configuration to the hybrid configuration it is always necessary to insert the electricity generator apparatus 300 into one of the compartments.

Before describing further construction and functional aspects of the invention, it is briefly explained below how this overcomes the limitations of the prior art, with reference to the non-limiting example case wherein the telehandler 1 is equipped with two compartments 100 made in the carriage 11, as explained above and the electricity generator apparatus is a diesel-electric generator 300.

The proposed telehandler 1 can work, when it is in its fully electrical configuration, without restrictions in town centres or in closed environments, powered by its batteries 200 contained in the lateral compartments 100 of the carriage 11.

When the work is finished, or in any case when it is necessary for the telehandler 1 to be moved to another site which is not close by, the operator will open one of the compartments and will extract the respective battery 200 (see the sequence of FIGS. 2, 3 and 4), unless the machine 1 is working with a single battery 200, in which case the hood 101 of the empty compartment will be opened.

At this point, the generator 300 will be inserted in the compartment 100 (see FIGS. 5 and 6) and will be connected to the electrical system inside the telehandler 1, which is now in its hybrid configuration, in such a way that the generator 300 charges the battery 200 contained in the other compartment 100. After that, having obtained the necessary autonomy, the telehandler 1 can be driven to the destination.

In the same way, once a telehandler 1 equipped on board with the generator 300 is carried close to a work site in which restrictions on the emissions are in force, the operators can open the compartment containing the generator 300, take it out, if necessary inserting in its place an electric battery 200 and then move the telehandler 1 in the fully electrical configuration to the work site.

It should be noted that the fact that the proposed telehandler 1 can be switched from the hybrid configuration to the fully electrical configuration and vice versa allows customers to have a versatile machine 1 which can work in environments with emission restrictions, but has the autonomy of a traditional hybrid machine or also of a traditional diesel machine; for this reason, customers can make savings by not having to purchase a plurality of telehandlers having different power supply systems.

Advantageously, it is also possible to replace the flat batteries 200 and the generators 300 which have finished the fuel.

For example, once one of the batteries 200 according to the invention is flat, it is sufficient to open the respective compartment 100, extracting the flat battery 200, which will then be carried for recharging to a site equipped with charging means connected to the national electricity network or according to other known means. In the meantime, the telehandler 1 can continue the programmed operations using the energy stored in the other battery 200.

After that, with the first battery 200 recharged, it will be again transported to the work site in order, for example, to replace the other battery 200, which in the meantime has drained and so on.

In any case, even if it is equipped with two (or more) compartments 100, the telehandler 1 may also use only one battery 200, if the activity for which it is used can be carried out before it drains or also use the current of both the batteries 200 simultaneously, as described in more detail below. On the other hand, if the telehandler 1 is equipped with a single compartment 100, it is still possible to use two batteries 200, so that once the battery housed in the compartment 100 has been discharged, the other one is already available near by, to enable replacement.

Preferably, the batteries 200 and the electricity generator apparatuses 300 which can be replaced according to the invention are equipped, at the lower side, with insertion seats 201, 301 for receiving the prongs of a loading fork, to allow the movement by means of a forklift truck. In other words, the battery 200 and the electricity generator apparatus 300 may have a bottom which defines or consists of or is fixed to a base shaped like a pallet, for the purpose of inserting forks and the movement with a customary forklift truck. In this case, the replacement occurs by opening the door 101, placing forks beneath the battery 200 or the electricity generator apparatus 300, after electrical disconnection and extracting it from the compartment 100 making it slide on the guide means 103, 104; subsequently, after placing forks beneath another battery 200 or another electricity generator apparatus, moving it to the height of the opening and then inserting it by sliding on the guide means 103, 104, examples of which are described in more detail below.

Preferably, the battery 200 comprises a connector 202 for dispensing the current (possibly only one), which can be connected to a respective single transmission cable 105 (possibly only one) positioned in the compartment 100, connected to the electrical system of the telehandler 1 and connected to the above-mentioned electric motors, for the purposes of their power supply. The accompanying drawings also show the optional solution is shown of providing an internal connector 102 to the compartment to which the cable 105 is attached when the door 101 is closed with an empty compartment 100; in this way, the telehandler 1 can be started, using the other battery 200 without an open circuit remaining in the system. Moreover, the battery 200 may be equipped with an ON/OFF switch 203 (indicated in FIG. 7) which is used to disconnect it electrically, without the need to disconnect the cable 105, to prevent it from being drained during non-operating periods when it remains on board the telehandler 1.

The invention provides optionally the use of an electricity generator apparatus consisting of a diesel-electric generator 300 with a new design, specifically conceived to be used in the hybrid configuration of the proposed telehandler.

Figure 9:
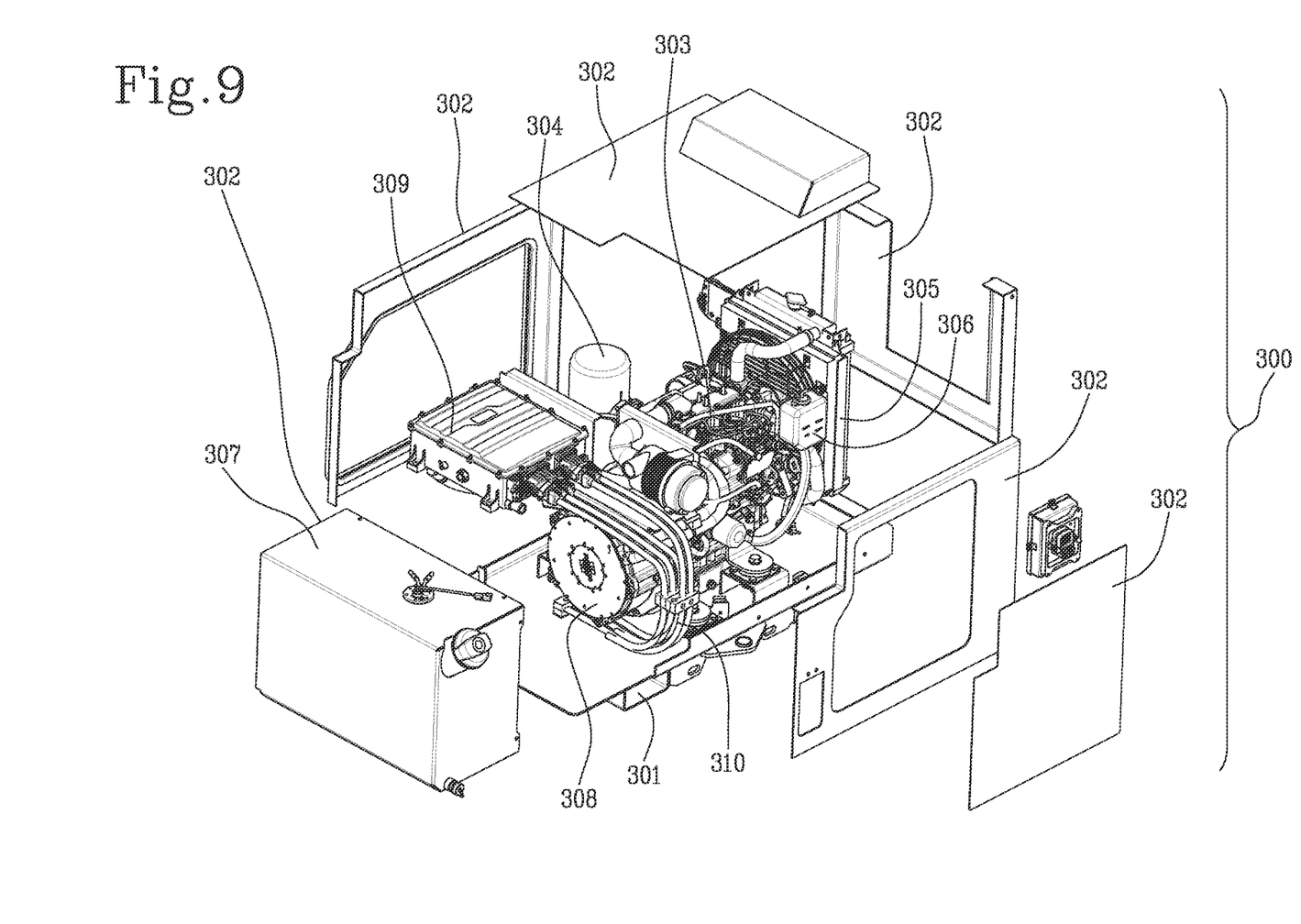
FIG. 9 is an exploded view of an electricity generator apparatus which can be used together with the proposed telehandler.

The apparatus 300, as shown in FIG. 9, includes a casing 302 which firstly contains an internal combustion engine 303, equipped with one or more exhaust pipes 304, facing downwards for emitting the exhaust gases outside the casing 302, a radiator 305 and a tank for the water 306. The tank 307 for the diesel oil which supplies the internal combustion engine 303 may also be positioned in such a way as to form one of the walls of the casing 302 which contains the above-mentioned components. The casing 302 also contains the actual generator 308, that is to say, the alternator which, driven by the internal combustion engine 303, produces the current with which the battery 200 of the telehandler 1 is charged, in its hybrid configuration.

The inverter 309 used to control this current may also be mounted on the outer surface of the casing 302, for example above the above-mentioned tank 307 and is connected to the generator 308 by suitable wiring 310. The casing 302 also mounts, externally, a connector 311 like that of the battery 200, designed to be connected to the above-mentioned transmission cable 105.

Still more in detail, the electrical system which connects the battery 200 to the motors and the electricity generator apparatus 300 to the battery 200, includes all the usual electrical and electronic devices for the operation of motors and other user devices, such as inverters positioned upstream of the motors, units for distributing the power supply downstream of the batteries 200 (typically one for each battery), chargers for charging the batteries 200 by means of an external socket (to be used if there is a power supply source close to the work site, for example a column for recharging the batteries) and the various circuits for the lighting of the flashing warning lights and reflectors, internal lighting, etc.

Figure 8:
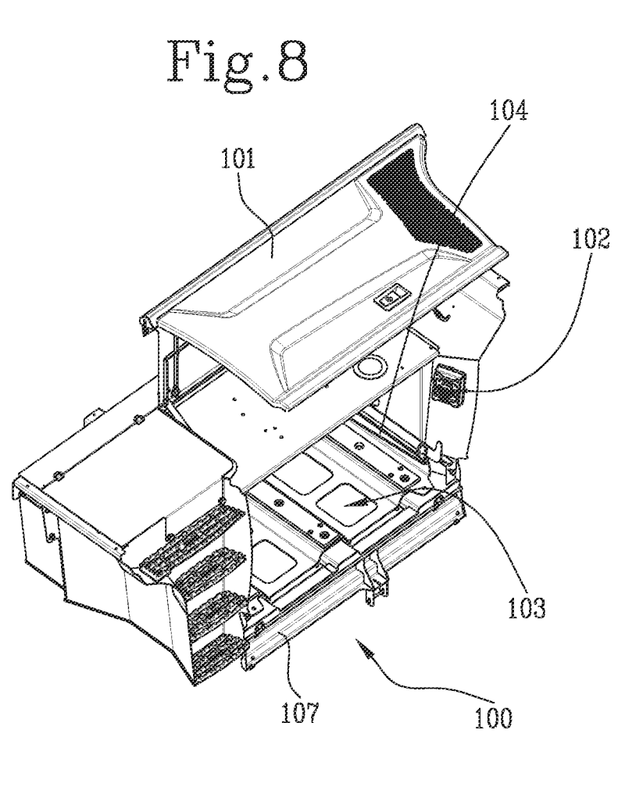

Preferably, as shown in FIG. 8, the above-mentioned guide means 103, 104 include a lower shaped surface 103 of the compartment 100, which is equipped with recesses for slidably receiving the seats 201 for inserting the prongs which are located at the lower surface of the energy source 200, 300 housed in the compartment 100.

Figure 7:
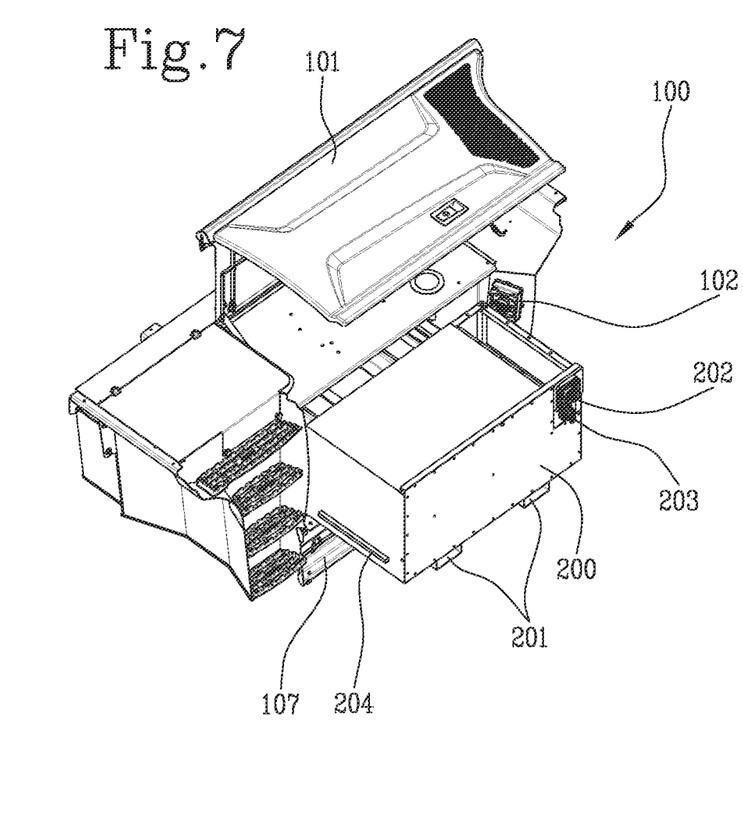
FIGS. 7 and 8 are axonometric views of a lateral part of the carriage of the proposed telehandler showing structural and functional details of a lateral load compartment.

Moreover, as shown in FIG. 7, the battery 200 and the electricity generator apparatus 300 may be equipped with respective engagement elements 204, for example in the form of wings protruding from respective opposite sides; it should be noted that, although the drawing only shows the case of the battery 200, the engagement elements 204 might also be mounted on the electricity generator apparatus 300.

The wings 204 which protrude from opposite lateral surfaces of the energy source 200, 300 allow a slidable engagement with respective lateral guide elements 104 (see FIG. 8), made, for example, by metal plates, which are positioned in the compartment 100, to define shelves 104 on which the wings 204 of the battery 200 or of the apparatus 300, which are therefore supported by them, slide into place.

Further, releasable locking means 106, consisting, for example, of screws and/or bolts, may be provided to prevent the involuntary extraction of the battery 200 from the inside of the compartment 100.

Moreover, there may also be a tilting retaining panel 107, hinged at the lower edge of the opening and which can be lowered upon completion of the extraction and insertion of the battery 200 or of the electricity generator apparatus.

Lastly, the invention may include electronic processing means, connectable to the battery 200 or to the batteries 200 contained/and in the compartment 100 and designed to adjust the supply of current.

In particular, the processing means, which may also consist of or included in or connected to the control unit usually used in telehandlers 1, include a current regulating module configured in such a way as to adjust the supply of current of the various batteries 200 according to variable proportions.

In other words, if the telehandler 1 is fitted with two batteries 200, for example, the operator in the cab can establish, by means of a user interface connected to the processing means, how much current is to be picked up from one of the batteries 200 relative to the other in order to supply the user devices of the vehicle; in particular cases, only one battery 200 supplies the electric motors of the telehandler 1 or both the batteries 200 dispense half of the electricity requested.

In the same way, the processing means may include a control module of the electricity generator apparatus 300, configured for adjusting its operation; again thanks to the above-mentioned interface, the operator can manage or set up the operation of the electricity generator apparatus 300 and the battery 200.

The invention claimed is:

1. A telehandler (1) comprising:
at least one electric propulsion motor;
a first compartment (100) provided with a first access opening to allow a user to insert or extract an electric battery (200) or an electricity generator apparatus (300) within the first compartment (100), such that the first compartment (100) can interchangeably receive the electric battery (200) and electricity generator apparatus (300); and
a second compartment (100) provided with a second access opening to allow a user to insert or retract the electric battery (200) or electricity generator apparatus (300) within the second compartment (100), such that the second compartment (100) can interchangeably receive the electric battery (200) and electricity generator apparatus (300),
wherein said telehandler (1) is configurable in two alternative power supply configurations:
a fully electrical configuration wherein the electric battery (200) is provided in the first compartment (100) and configured for supplying power to said at least one electric propulsion motor; and
a hybrid configuration wherein said electricity generator apparatus (300) is provided in the first compartment (100) and the electric battery (200) is provided in the second compartment (100).

2. The telehandler (1) according to claim 1, wherein in said hybrid configuration, the electric battery (200) supplies power to the at least one electric propulsion motor, and the electricity generator apparatus (300) charges said electric battery (200).

3. The telehandler (1) according to claim 1, wherein said electricity generator apparatus (300) is a diesel-electric generator.

4. The telehandler (1) according to claim 1, wherein the electricity generator apparatus (300) is a fuel cell.

5. The telehandler (1) according to claim 1, which can be switched from said fully electrical configuration to said hybrid configuration following the insertion of the electricity generator apparatus (300) in the first compartment (100), and from the hybrid configuration to the fully electrical configuration following the extraction of the electricity generator apparatus (300) from the first compartment (100).

6. The telehandler (1) according to claim 1, wherein the first compartment comprises guide means (103, 104) for the sliding of the electric battery (200) or the electricity generator apparatus (300) during the respective insertion or extraction.

7. The telehandler (1) according to claim 1, comprising a carriage (11) movable on wheels, wherein the first compartment (100) is made in said carriage (11), with the access opening positioned on a side of the carriage (11).

8. The telehandler (1) according to claim 7, wherein the first and second access openings of the first and second compartments (100) are positioned at opposite sides of the carriage (11).

9. The telehandler (1) according to claim 1, wherein the electric battery (200) is equipped, at a lower side, with insertion seats (201) for receiving the prongs of a loading fork, to allow the movement by means of a forklift truck.

10. The telehandler (1) according to claim 9, wherein the first compartment (100) comprises guide means (103, 104) for the sliding of the electric battery (200) during the insertion or extraction, wherein said guide means (103, 104) includes a lower surface (103) of the first compartment (100) shaped in such a way as to slidably receive said insertion seats (201).

11. The telehandler (1) according to claim 1, wherein the electricity generator apparatus (300) is equipped, at a lower side, with insertion seats (301) for receiving the prongs of a loading fork, to allow the movement by means of a forklift truck.

12. The telehandler (1) according to claim 1, comprising releasable locking means (106, 107) to prevent involuntary extraction of the electric battery (200) or electricity generator apparatus (300) from the inside of the first compartment (100).

13. The telehandler (1) according to claim 1, wherein in the hybrid configuration, the electric battery (200) supplies power to the at least one electric propulsion motor, and the electricity generator apparatus (300) charges said electric battery (200).

14. The telehandler (1) according to claim 1, wherein the telehandler (1) is configured in the fully electrical configuration.

15. The telehandler (1) according to claim 1, wherein the telehandler (1) is configured in the hybrid configuration.

16. The telehandler (1) according to claim 1, wherein:
the first compartment includes a first door for the first access opening, and
the second compartment includes a second door for the second access opening.

17. A method of using the telehandler (1) according to claim 1, wherein the telehandler (1) is configured in the fully electrical configuration and then switched from said fully electrical configuration to said hybrid configuration.

* * * * *